US009512790B2

(12) United States Patent
Nagar (10) Patent No.: US 9,512,790 B2
(45) Date of Patent: *Dec. 6, 2016

(54) SYSTEM AND METHOD FOR AIR HANDLING CONTROL IN OPPOSED-PISTON ENGINES WITH UNIFLOW SCAVENGING

(71) Applicant: Achates Power, Inc., San Diego, CA (US)

(72) Inventor: Nishit Nagar, San Diego, CA (US)

(73) Assignee: Achates Power, Inc., San Diego, CA (US)

(*) Notice: Subject to any disclaimer, the term of this patent is extended or adjusted under 35 U.S.C. 154(b) by 754 days.

This patent is subject to a terminal disclaimer.

(21) Appl. No.: 13/974,935

(22) Filed: Aug. 23, 2013

(65) Prior Publication Data

US 2014/0373816 A1 Dec. 25, 2014

Related U.S. Application Data

(63) Continuation-in-part of application No. 13/926,360, filed on Jun. 25, 2013, now Pat. No. 9,206,751.

(51) Int. Cl.
 *F02B 25/08* (2006.01)
 *F02D 41/00* (2006.01)
 (Continued)

(52) U.S. Cl.
 CPC ............ *F02D 41/0007* (2013.01); *F01B 7/14* (2013.01); *F02B 75/28* (2013.01);
 (Continued)

(58) Field of Classification Search
 CPC .. F02D 41/0007; F02D 41/18; F02D 41/0072;
 F02D 41/0062; F02D 43/00; F01B 7/14;
 F02B 75/28; F02B 75/282; F02B 37/18;
 F02B 29/00; F02M 26/23; F02M 26/05;
 F02M 35/10386; Y02T 10/144; Y02T 10/47

See application file for complete search history.

(56) References Cited

U.S. PATENT DOCUMENTS 5,323,748 A 6/1994 Foster et al.
5,509,394 A 4/1996 Hitomi et al. ............. 123/559.1
(Continued)

FOREIGN PATENT DOCUMENTS

EP 1528241 A2 5/2005
FR 2868127 A1 9/2005
(Continued)

OTHER PUBLICATIONS

International Search Report and Written Opinion for PCT application No. PCT/US2014/042394, mailed Oct. 17, 2014.
(Continued)

*Primary Examiner* — Hung Q Nguyen
(74) *Attorney, Agent, or Firm* — Terrance A. Meador (57) ABSTRACT

In an air handling system of a uniflow-scavenged, two-stroke cycle opposed-piston engine, repeatable trapped mass and composition are achieved by determining provision of air handling setpoints that control operation of the engine's air handling system components. In some aspects, these setpoints govern operations of the air handling system by actively controlling the intake manifold pressure (IMP), EGR flow, and exhaust channel backpressure.

22 Claims, 6 Drawing Sheets

(51) Int. Cl.
| | |
|---|---|
| *F02B 75/28* | (2006.01) |
| *F02D 43/00* | (2006.01) |
| *F02D 41/18* | (2006.01) |
| *F01B 7/14* | (2006.01) |
| *F02B 37/24* | (2006.01) |
| *F02D 41/14* | (2006.01) |
| *F02M 35/10* | (2006.01) |
| *F02B 29/04* | (2006.01) |
| *F02B 33/00* | (2006.01) |
| *F02B 37/18* | (2006.01) |
| *F02B 39/04* | (2006.01) |

(52) U.S. Cl.
CPC ..... *F02D 41/0062* (2013.01); *F02D 41/0072* (2013.01); *F02D 41/18* (2013.01); *F02D 43/00* (2013.01); *F02B 25/08* (2013.01); *F02B 29/0412* (2013.01); *F02B 29/0418* (2013.01); *F02B 33/00* (2013.01); *F02B 37/18* (2013.01); *F02B 37/24* (2013.01); *F02B 39/04* (2013.01); *F02B 75/282* (2013.01); *F02D 2041/141* (2013.01); *F02D 2200/0402* (2013.01); *F02D 2200/0406* (2013.01); *F02D 2200/0414* (2013.01); *F02D 2400/04* (2013.01); *F02M 26/05* (2016.02); *F02M 26/23* (2016.02); *F02M 35/1038* (2013.01); *F02M 35/10386* (2013.01); *Y02T 10/144* (2013.01); *Y02T 10/47* (2013.01)

(56) References Cited

U.S. PATENT DOCUMENTS

| | | | |
|---|---|---|---|
| 6,742,335 B2 | 6/2004 | Beck et al. ............ 60/605.2 |
| 6,925,971 B1 | 8/2005 | Peng et al. ............ 123/46 R |
| 6,948,475 B1 | 9/2005 | Wong et al. ............ 123/299 |
| 7,128,063 B2 | 10/2006 | Kang | |
| 7,281,531 B1 | 10/2007 | Fulton et al. ............ 123/568.17 |
| 7,565,892 B1 | 7/2009 | Cleary et al. | |
| 8,109,258 B2 | 2/2012 | Allain et al. ............ 123/568.16 |
| 8,549,854 B2 | 10/2013 | Dion et al. | |
| 9,284,884 B2 * | 3/2016 | Nagar ............ F02B 75/28 |
| 2002/0195086 A1 | 12/2002 | Beck et al. | |
| 2003/0230276 A1 | 12/2003 | Kataoka et al. | |
| 2005/0096833 A1 | 5/2005 | Nakazawa | |
| 2006/0016438 A1 | 1/2006 | Kang | |
| 2009/0159022 A1 | 6/2009 | Chu ............ 123/52.2 |
| 2009/0249783 A1 | 10/2009 | Gokhale et al. ............ 60/602 |
| 2010/0293943 A1 | 11/2010 | Teng et al. ............ 60/602 |
| 2010/0293944 A1 | 11/2010 | Hunter ............ 60/605.2 |
| 2011/0022289 A1 | 1/2011 | Hofbauer | |
| 2011/0289916 A1 | 12/2011 | Dion et al. | |
| 2012/0125298 A1 | 5/2012 | Lemke et al. | |
| 2012/0210985 A1 | 8/2012 | Fuqua et al. | |
| 2013/0125544 A1 | 5/2013 | Mond et al. | |
| 2013/0174545 A1 | 7/2013 | Andrasko et al. | |
| 2013/0174548 A1 | 7/2013 | Dion ............ 60/605.2 |
| 2013/0333665 A1 | 12/2013 | Pursifull | |
| 2014/0299104 A1 | 10/2014 | Quechon et al. | |
| 2014/0373814 A1 | 12/2014 | Herold et al. | |
| 2014/0373815 A1 | 12/2014 | Nagar et al. | |
| 2014/0373816 A1 | 12/2014 | Nagar | |

FOREIGN PATENT DOCUMENTS

| | | | |
|---|---|---|---|
| FR | 2982641 A1 | 5/2013 | |
| WO | 2011/146111 A1 | 11/2011 | ............ F02B 25/08 |
| WO | 2012/067643 A1 | 5/2012 | ............ F01B 7/14 |
| WO | 2013/126347 A1 | 8/2013 | ............ F02B 37/04 |
| WO | WO2014/146111 A1 | 12/2014 | |

OTHER PUBLICATIONS

International Search Report and Written Opinion for PCT application No. PCT/US2014/051102, mailed Dec. 15, 2014.
International Search Report and Written Opinion for PCT application No. PCT/US2014/051108, mailed Nov. 24, 2014.
International Search Report and Written Opinion for PCT application PCT/US2011/000864, mailed Aug. 1, 2011.
International Search Report and Written Opinion for PCT application PCT/US2013/026737, mailed Jun. 26, 2013.
Blair, G.P., Chapter 1: "Introduction to the Two-Stroke Engine"; Design and Stimulation of Two-Stroke Engines; 1996; pp. 1-34.
Non-Final Office Action mailed Jan. 2, 2015 in U.S. Appl. No. 13/926,360.
Amendment and Request for Reconsideration submitted by EFS on Apr. 2, 2015 in U.S. Appl. No. 13/926,360.
Final Office Action mailed May 1, 2015 in U.S. Appl. No. 13/926,360.

* cited by examiner

SYSTEM AND METHOD FOR AIR HANDLING CONTROL IN OPPOSED-PISTON ENGINES WITH UNIFLOW SCAVENGING

PRIORITY

This application is a continuation-in-part of U.S. application Ser. No. 13/926,360, filed Jun. 25, 2013, which is incorporated herein by reference.

RELATED APPLICATIONS

This application contains subject matter related to that of the following commonly-assigned applications: U.S. application Ser. No. 13/068,679, filed May 16, 2011, published as US 2011/0289916 on Dec. 1, 2011; PCT application US2013/026737, filed Feb. 19, 2013; U.S. application Ser. No. 13/782,802, filed Mar. 1, 2013; and U.S. application Ser. No. 13/891,622, filed May 10, 2013.

BACKGROUND

The field is two-stroke cycle internal combustion engines. Particularly, the field relates to uniflow-scavenged, opposed-piston engines with air handling systems that provide pressurized charge air for combustion, and that process the products of combustion. In some aspects, such air handling systems recirculate and mix exhaust gas with the pressurized charge air in order to lower combustion temperatures.

A two-stroke cycle engine is an internal combustion engine that completes a power cycle with a single complete rotation of a crankshaft and two strokes of a piston connected to the crankshaft. One example of a two-stroke cycle engine is an opposed-piston engine with one or more cylinders, in which two pistons are disposed in opposition in the bore of each cylinder for reciprocating movement in opposing directions. Each cylinder has longitudinally-spaced inlet and exhaust ports that are located near respective ends of the cylinder. Each of the opposed pistons in the cylinder controls one of the ports, opening the port as it moves to a bottom center (BC) location, and closing the port as it moves from BC toward a top center (TC) location. One of the ports provides passage for the products of combustion out of the bore, the other serves to admit charge air into the bore; these are respectively termed the "exhaust" and "intake" ports. In a uniflow-scavenged opposed-piston engine, charge air enters a cylinder through its intake port and exhaust gas flows out of its exhaust port, thus gas flows through the cylinder in a single direction ("uniflow")—from intake port to exhaust port. The flow of gas is referred to as the "gas exchange" process. The gas exchange process occurs during that part of the cycle when the intake and exhaust ports are open. For each cylinder of the engine, gas exchange starts at the first port opening of a cycle and stops at the last port closure of the cycle.

Figure 1:
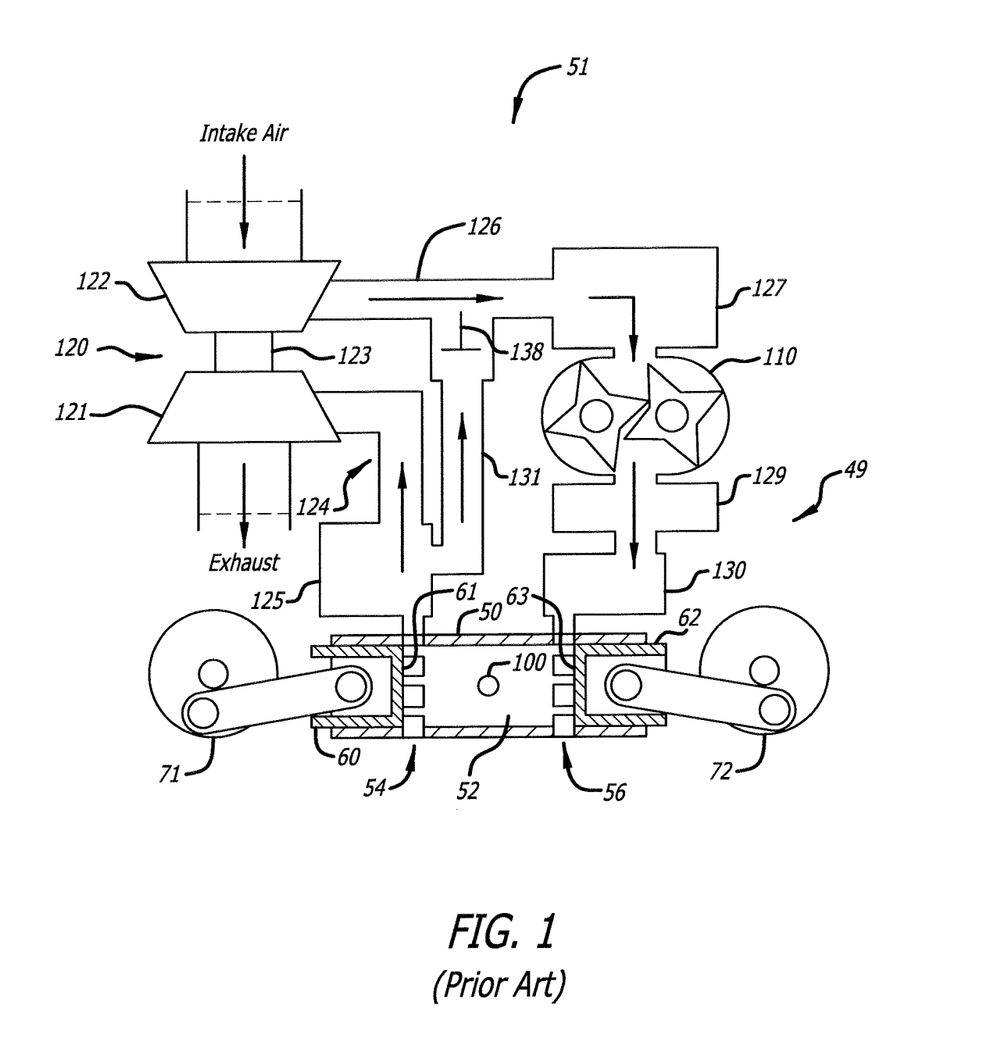
FIG. 1 is a diagram of an opposed-piston engine equipped with an air handling system with EGR and is properly labeled "Prior Art".

In FIG. 1, a uniflow-scavenged, two-stroke cycle internal combustion engine is embodied by an opposed-piston engine 49 having at least one ported cylinder 50. For example, the engine may have one ported cylinder, two ported cylinders, three ported cylinders, or four or more ported cylinders. Each ported cylinder 50 has a bore 52 and longitudinally-spaced exhaust and intake ports 54 and 56 formed or machined in the cylinder wall, near respective ends of the cylinder. Each of the exhaust and intake ports 54 and 56 includes one or more circumferential arrays of openings in which adjacent openings are separated by a solid bridge. In some descriptions, each opening is referred to as a "port"; however, the construction of a circumferential array of such "ports" is no different than the port constructions shown in FIG. 1. In the example shown, the engine 49 further includes two crankshafts 71 and 72. The exhaust and intake pistons 60 and 62 are slidably disposed in the bore 52 with their end surfaces 61 and 63 opposing one another. The exhaust pistons 60 are coupled to the crankshaft 71, and the intake pistons are coupled to the crankshaft 72.

As the pistons 60 and 62 near TC, a combustion chamber is defined in the bore 52 between the end surfaces 61 and 63 of the pistons. Fuel is injected directly into the combustion chamber through at least one fuel injector nozzle 100 positioned in an opening through the sidewall of a cylinder 50. The fuel mixes with charge air admitted into the bore through the intake port 56. As the air-fuel mixture is compressed between the end surfaces it reaches a temperature that causes combustion.

With further reference to FIG. 1, the engine 49 includes an air handling system 51 that manages the transport of charge air provided to, and exhaust gas produced by, the engine 49. A representative air handling system construction includes a charge air subsystem and an exhaust subsystem. In the air handling system 51, the charge air subsystem includes a charge source that receives fresh air and processes it into charge air, a charge air channel coupled to the charge air source through which charge air is transported to the at least one intake port of the engine, and at least one air cooler in the charge air channel that is coupled to receive and cool the charge air (or a mixture of gasses including charge air) before delivery to the intake port or ports of the engine. Such a cooler can comprise an air-to-liquid and/or an air-to-air device, or another cooling device. The exhaust subsystem includes an exhaust channel that transports exhaust products from exhaust ports of the engine for delivery to other exhaust components.

With further reference to FIG. 1, the air handling system 51 includes a turbocharger 120 with a turbine 121 and a compressor 122 that rotate on a common shaft 123. The turbine 121 is coupled to the exhaust subsystem and the compressor 122 is coupled to the charge air subsystem. The turbocharger 120 extracts energy from exhaust gas that exits the exhaust ports 54 and flows into an exhaust channel 124 directly from the exhaust ports 54, or from an exhaust manifold 125 that collects exhaust gasses output through the exhaust ports 54. In this regard, the turbine 121 is rotated by exhaust gas passing through it. This rotates the compressor 122, causing it to generate charge air by compressing fresh air. The charge air subsystem includes a supercharger 110. The charge air output by the compressor 122 flows through a charge air channel 126 to a cooler 127, whence it is pumped by the supercharger 110 to the intake ports. Charge air compressed by the supercharger 110 can be output through a cooler 129 to an intake manifold 130. In this regard, each intake port 56 receives pressurized charge air from the intake manifold 130. Preferably, in multi-cylinder opposed-piston engines, the intake manifold 130 is constituted of an intake plenum that communicates with the intake ports 56 of all cylinders 50.

In some aspects, the air handling system shown in FIG. 1 can be constructed to reduce NOx emissions produced by combustion by recirculating exhaust gas through the ported cylinders of the engine. The recirculated exhaust gas is mixed with charge air to lower peak combustion temperatures, which reduces production of NOx. This process is referred to as exhaust gas recirculation ("EGR"). The EGR construction shown obtains a portion of the exhaust gasses flowing from the port 54 during scavenging and transports them via an EGR loop external to the cylinder into the incoming stream of fresh intake air in the charge air subsystem. Preferably, the EGR loop includes an EGR channel 131. The recirculated exhaust gas flows through the EGR channel 131 under the control of a valve 138 (this valve is also called the "EGR valve").

In many two-stroke engines, combustion and EGR operation are monitored and optimized based on various measurements related to the amount of charge air delivered to the engine. For example, the ratio of the mass of charge air delivered to a cylinder to the reference mass of charge air required for stoichiometric combustion in the cylinder ("lambda") is used to control NOX emissions over a range of engine operating conditions. However, in a two-stroke cycle opposed-piston engine with uniflow scavenging, port opening times overlap for a portion of each cycle and some of the charge air delivered to a cylinder through its intake port flows out of the cylinder before the exhaust port is closed. The charge air flowing out of the exhaust port during scavenging is not available for combustion. Thus, a value of lambda based on charge air delivered ("delivered lambda") to the intake port of a cylinder in an opposed-piston engine with uniflow scavenging overstates the amount of charge air actually available for combustion.

According to priority application Ser. No. 13/926,360, in a two-stroke cycle opposed-piston engine with uniflow scavenging, trapped lambda ($\lambda_{tr}$) is estimated or calculated based upon the charge air trapped in a cylinder by the last port to close. In this regard, the last port to close can be either the intake port or the exhaust port. Relatedly, the ratio of the mass of charge air trapped in the cylinder by the last port to close (hereinafter, "last port closing", or "LPC") to a reference mass of charge air required for stoichiometric combustion in the cylinder is referred to as "trapped lambda". Since it is the trapped charge air that is available for combustion, a trapped lambda model provides a more accurate representation of the combustion and emission potentials of the engine than a delivered lambda model.

Other air handling parameters are used to control various aspects of combustion and EGR operation in two-stroke engines and determinations of their values are based on estimations or calculations that include lambda. For example, burned gas fraction (ratio of burned gas to in-cylinder mass) has a significant impact on the combustion process and thus the emissions of a two-stroke engine. Priority application Ser. No. 13/926,360 discloses a method for determining trapped burned gas fraction ($BF_{tr}$) based on trapped lambda. The trapped burned gas fraction is used to vary the EGR flow rate using an EGR valve to minimize the error between the actual and desired trapped burned gas fraction.

During operation of a two-stroke cycle opposed-piston engine with uniflow scavenging, engine performance and emissions are dependent on the trapped in-cylinder charge composition. Priority application Ser. No. 13/926,360 describes detailed models for determining trapped conditions which include trapped lambda, trapped burned gas fraction and trapped temperature. These trapped parameters greatly affect the performance and emissions of the engine, and thus need to be controlled to meet engine performance and emissions goals.

Accordingly, there is a need to improve the performance of air handling control in uniflow-scavenged, opposed-piston engines by controlling the trapped in-cylinder charge composition over a range of engine operating conditions.

SUMMARY

To achieve reliable combustion and emissions performance of a two-stroke cycle opposed-piston engine with uniflow scavenging it is desirable to have repeatable trapped mass and composition at the end of the gas exchange process for any engine operating state. In this regard, for a current engine operating state, control of trapped conditions is based upon desired operating setpoints—preset or predetermined values—that govern the engine's air handling system. For example, desired trapped conditions such as trapped lambda and trapped burned gas fraction are established by desired air handling setpoints that control operation of air handling system components. That is to say, the trapped conditions should not vary from one cycle to the next during a current engine operating state. Then, as the engine operating state changes, the setpoints have to be changed in order to achieve desired trapped conditions for another operating state. Furthermore, given the complex dynamics of engine operation, it is frequently the case that changed engine conditions (ambient factors, new parts, tune up, wear, etc.) prevent the achievement of the desired trapped conditions by use of the desired setpoints. Thus, it may be desirable to adjust or correct current desired setpoints in response to ambient engine conditions in order to achieve the desired trapped conditions.

These goals are achieved in an air handling system of a two-stroke cycle opposed-piston engine with uniflow scavenging by active control of the intake manifold pressure (IMP), the flow of exhaust gas through the EGR loop (EGR flow), and the rate of fresh air flow into the charge air subsystem (fresh air flow).

In some aspects, intake manifold pressure is controlled by adjusting the supercharger output, EGR flow is controlled by adjusting an EGR flow control mechanism, and the rate of fresh air flow into the charge air subsystem is controlled by adjusting pressure in the exhaust subsystem.

In some aspects, supercharger output is controlled by adjusting a supercharger control mechanism. In some other aspects, pressure in the exhaust subsystem is controlled by adjusting one or more exhaust subsystem back pressure control mechanisms.

DETAILED DESCRIPTION OF PREFERRED EMBODIMENTS

It is desirable to control the flow of charge air through the charge air channel of a two-stroke cycle opposed-piston engine with uniflow scavenging in order to maintain optimal control of combustion and emissions in response to variations in the operational state of the engine. Using the engine of FIG. 1 as a basis, FIG. 2 shows a control mechanization for such an opposed-piston engine, based on modifications and additions that are useful for controlling the air handling system according to this specification.

Figure 2:
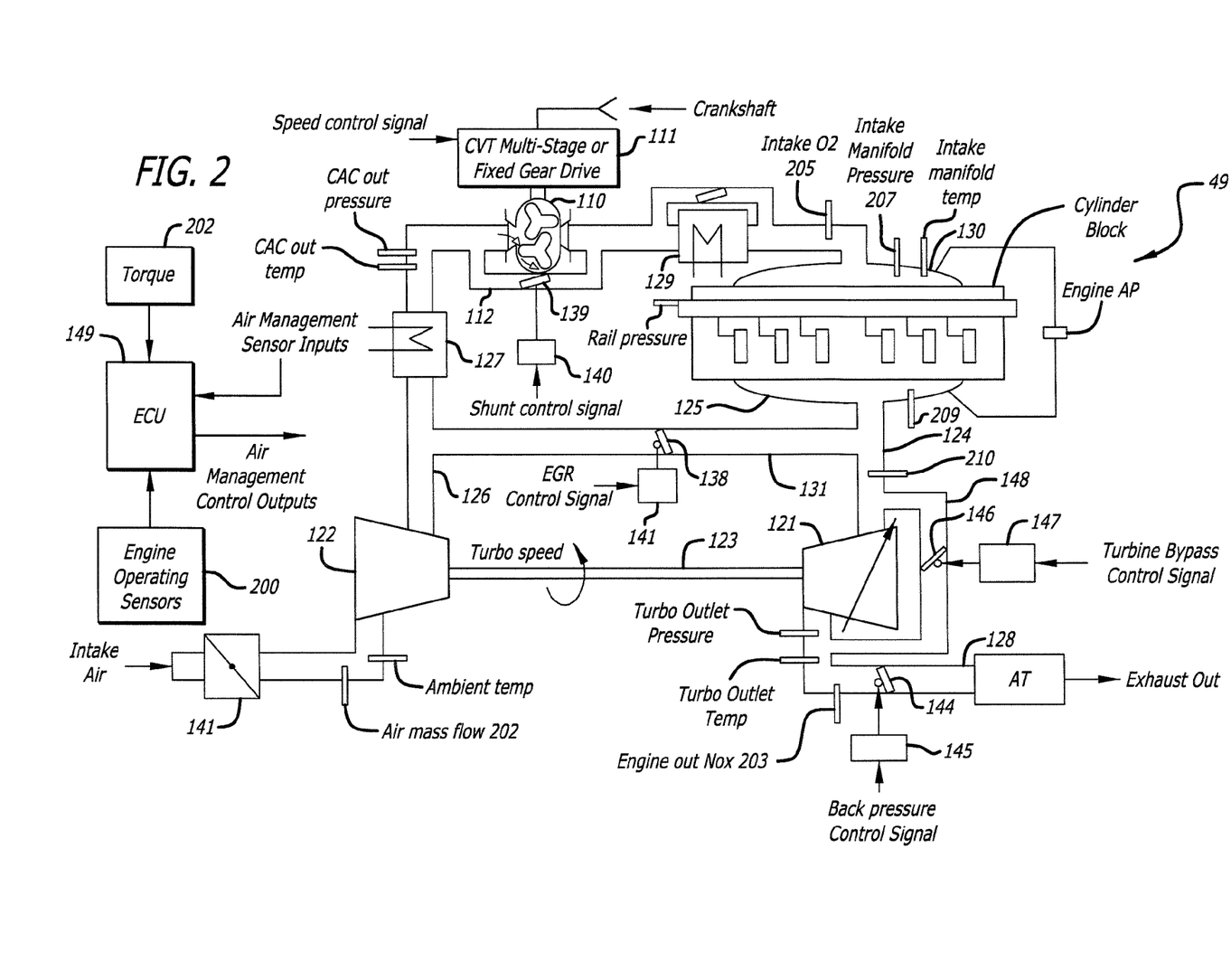
FIG. 2 is a schematic drawing illustrating a control mechanization for regulation of an air handling system in an opposed-piston engine.

An example of a specific EGR loop construction for a two-stroke cycle opposed-piston engine with uniflow scavenging is the high pressure configuration is illustrated in FIG. 2 (which is not intended to be limiting). In this regard, a high pressure EGR loop circulates exhaust gas obtained from a source upstream of the input to the turbine 121 to a mixing point downstream of the output of the compressor 122. In this EGR loop, the EGR channel 131 and the EGR valve 138 shunt a portion of the exhaust gas from the exhaust channel 124 into the charge air channel 126 where it is mixed with compressed fresh air output by the compressor 122. Operation of the valve 138 is controlled by the actuator 141 in response to an EGR control signal. If no exhaust/air mixing is required, the valve 138 is fully shut and charge air with no exhaust gas component is delivered to the cylinders. As the valve 138 is increasingly opened, an increasing amount of exhaust gas is mixed into the charge air. Conversely, from an open state, as the valve 138 is increasingly closed, a decreasing amount of exhaust gas is mixed into the charge air. This loop subjects the recirculated exhaust gas to the cooling effects of the two coolers 127 and 129. If less cooling is merited, the exhaust gas portion can be shunted around the cooler 127 to the input of the supercharger 110; this alternative subjects the exhaust gas portion to cooling by only the charge air cooler 129. A dedicated EGR cooler to cool only exhaust gas can be incorporated into the EGR channel 131, in series with the valve 138, or in series with the output port of the valve 138 and the input to the supercharger 110.

Additional air handling control elements include a variable valve 144 placed in series with exhaust gas output by the turbine 121. The setting of the valve 144 directly influences the backpressure felt upstream of the valve, including in the charge air channel; for this reason, the valve 144 may also be referred to as a "backpressure valve". In FIG. 2, the valve 144 is placed in the exhaust outlet 128, in series with the output of the turbine 121. Operation of the valve 144 is controlled by the actuator 145 in response to a backpressure control signal. A bypass conduit loop 148 including a valve 146 is placed in parallel with the turbine 121. The valve 146 (also referred to as a "wastegate valve") is operated to control the amount of exhaust gas flowing from the engine into the turbine 121. Setting the valve 146 to bypass the turbine 121 allows exhaust energy to be dumped into the exhaust outlet 128 without operating the turbine 121 and compressor 122. Operation of the valve 146 is controlled by the actuator 147 in response to a turbine bypass control signal.

With further reference to FIG. 2, the turbine 121 may include a variable geometry turbine (VGT) to control pressure in the exhaust channel 124. Using a variable geometry turbine instead of a fixed geometry turbine does not necessarily eliminate the need for the valve 146. A variable geometry turbine may have a limited mass flow range where it works at acceptable efficiencies. Outside this range, the valve 146 can be used to control the mass flow and intake pressure of the engine 49.

As per FIG. 2, in most aspects the supercharger 110 is coupled by a drive mechanism 111 to a crankshaft to be driven thereby. The drive mechanism 111 can comprise a stepwise transmission device or continuously variable transmission (CVT) device, in which cases, charge air flow can be varied by varying the speed of the supercharger 110 in response to a speed control signal provided to the drive mechanism. Alternatively, the drive mechanism 111 can be a fixed gear device, in which case the supercharger 110 is continuously driven at a fixed speed. In such a case, charge air flow can be varied by way of a shunt channel 112 that couples the output of the supercharger 110 to its input. Provision of a valve 139 in the shunt channel 112 allows the charge air flow to be varied by modulation of charge air pressure downstream of the supercharger outlet. In some aspects, the valve 139 is operated by an actuator 140 in response to a shunt control signal.

As seen in FIG. 2, a control mechanization to operate the air handling system of a two-stroke cycle opposed-piston engine with uniflow scavenging includes an ECU 149. Preferably, the ECU 149 is constructed to control charge air flow and the amount of exhaust gas mixed with the pressurized charge air in response to specified engine operating conditions by automatically operating the valves 138, 139, 144, and 146 (and, possibly other valves), the supercharger 110, if a multi-speed or variable speed device is used, and the turbo-charger, if a variable-geometry device is used. Of course, operation of valves and associated elements used for EGR can include any one or more of electrical, pneumatic, mechanical, and hydraulic actuating operations. For fast, precise automatic operation, it is preferred that the valves be high-speed, computer-controlled devices with continuously-variable settings. Each valve has a state in which it is open (to some setting controlled by the ECU 149) to allow gas to flow through it, and a state in which it is closed to block gas from flowing through it.

Systems and methods for operating the air handling system of a two-stroke cycle opposed-piston engine with uniflow scavenging in order to achieve desired trapped conditions determine magnitudes and values of various parameters and use those magnitudes and values to control air handling conditions externally of the cylinders of the engine. See, for example, the parameters discussed and explained in priority application Ser. No. 13/926,360. The description of air handling system control of trapped conditions according to this specification references the following air handling parameters and refers to various elements of an air handling control mechanization according to FIG. 2. All of the air handling parameters in the following explanation have SI units unless specified otherwise.

Air Handling Parameters $M_{tr}$=Trapped mass at LPC in kg
$\lambda_{tr}$=Trapped lambda
$BF_{tr}$=Trapped burned gas fraction
$T_{tr}$=Trapped temperature
$T_{im}$=Intake manifold temperature
$W_{air}$=Mass flow rate of fresh air in kg/s
$W_{egr}$=Mass flow rate of EGR gas in kg/s
$W_f$=Mass flow rate of fuel in kg/s
$P_{im}$=intake manifold pressure A useful method for modeling trapped lambda is given in priority application Ser. No. 13/926,360 by:

$$\lambda_{tr} = \left(\frac{N}{W_f} \frac{M_{O_2,tr} RPM}{60}\right) \Big/ \left(\frac{O_2}{F}\right)_s \quad \text{Eq 1}$$

Burned gas is a gas composition that is the result of stoichiometric combustion of fuel. This gas composition does not have any oxygen molecules; typically, it comprises CO2, H2O, N2 and other inert gases present in air.

Burned gas fraction is a ratio of burned gases to a reference mass. A burned gas fraction of 1 indicates stoichiometric combustion, implying that all the oxygen in the air has been used up to convert fuel ($C_xH_y$) into $CO_2$ and $H_2O$. On the other hand, a burned gas fraction of <1 indicates non-stoichiometric combustion, implying that some oxygen remains in addition to the burned gas.

Trapped burned gas fraction is a ratio of burned gas trapped in a cylinder at the end of the gas exchange process to a the trapped mass.

At the end of the gas exchange process, signified by LPC, the trapped mass is equal to trapped air and trapped burned gases. Thus, a trapped burned gas fraction can be modeled as follows:

$$BF_{tr} = \left( M_{tr} - \frac{W_f}{N} \frac{\lambda_{tr} \cdot AFR_s \cdot 60}{RPM} \right) / M_{tr} \qquad \text{Eq 2}$$

Another method of modeling a trapped burned gas fraction is given by Equation 35 in priority application Ser. No. 13/926,360.

Air Handling Control:

It is desirable to control trapped conditions in a two-stroke cycle opposed-piston engine with uniflow scavenging so as to meet performance and emissions goals. In basic terms, the in-cylinder trapped conditions parameters can be related to external engine parameters by the following control equations:

$M_{tr}=f(P_{im}, W_{air}, W_{egr}, T_{im})$ $\lambda_{tr}=f(P_{im}, W_{air}, W_{egr}, W_f, T_{im})$ $BF_{tr}=f(M_{tr}, \lambda_{tr}, W_f)$ $T_{tr}=f(M_{tr}, P_{im})$ In order to reach a desired load at a given speed, the fuel flow is a known value based on engine/vehicle dynamometer testing. The intake manifold temperature is a slow-moving parameter that is mainly determined by the sizing of heat exchangers, and does not move significantly. Thus, for a given fuel quantity and intake manifold temperature, the control equations can be simplified further as follows:

$[\lambda_{tr}, BF_{tr}, T_{tr}]=f(P_{im}, W_{egr}, W_{air})$

For a given load and speed, the desired values for $P_{im}$ (IMP), $W_{egr}$ (EGR flow), and $W_{air}$ (fresh air flow) are determined on an engine/vehicle dynamometer to provide the correct trapped conditions for that particular load speed point. The IMP, EGR flow and fresh air flow values are then stored in look-up tables (LUT) in or with the ECU 149 that are indexed by engine load and speed and controlled according to algorithms described in priority application Ser. No. 13/926,360.

The setpoints for IMP, EGR flow, and fresh air flow are compensated for intake manifold temperature and delivered fuel quantity variations from their respective base value. These variations may arise due to factors such as component aging, changes in ambient conditions and DPF loading among other reasons. The control strategy always tries to maintain the desired IMP, EGR flow, and fresh air flow in order to get repeatable engine performance and emissions.

Figure 3:
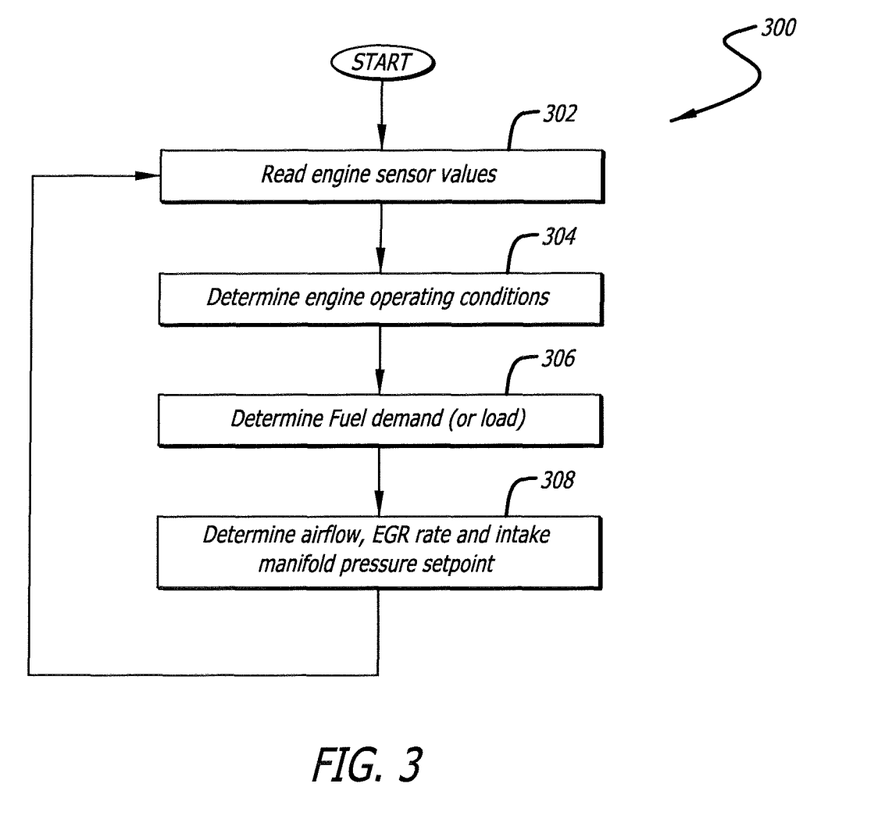
FIG. 3 is a control flow diagram showing a loop for determining numerical values of air handling control parameters during engine operation.
Figure 4A:
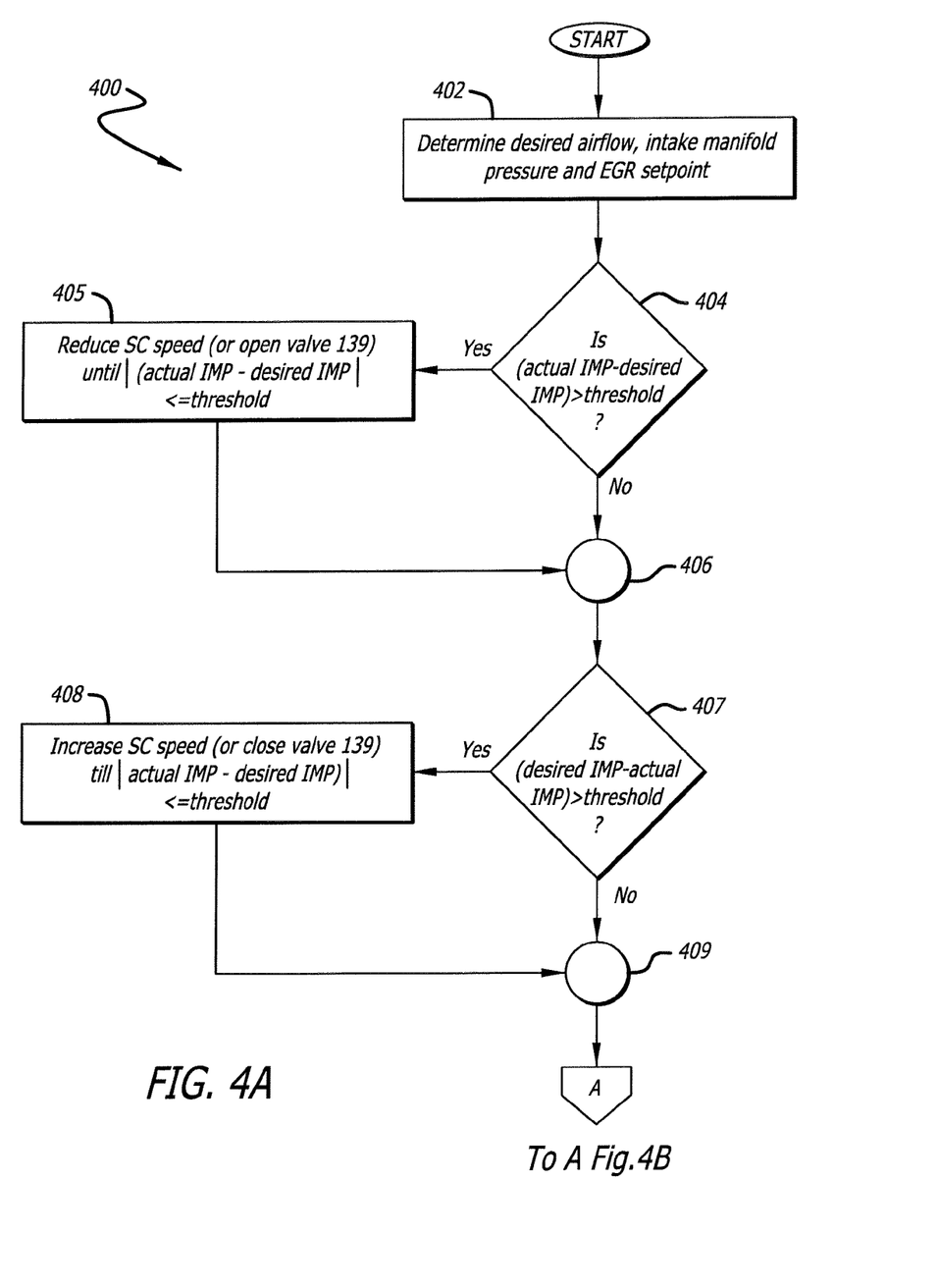
FIGS. 4A and 4B constitute a control flow diagram showing a process for evaluating and adjusting the numerical values of the air handling control parameters.
Figure 4B:
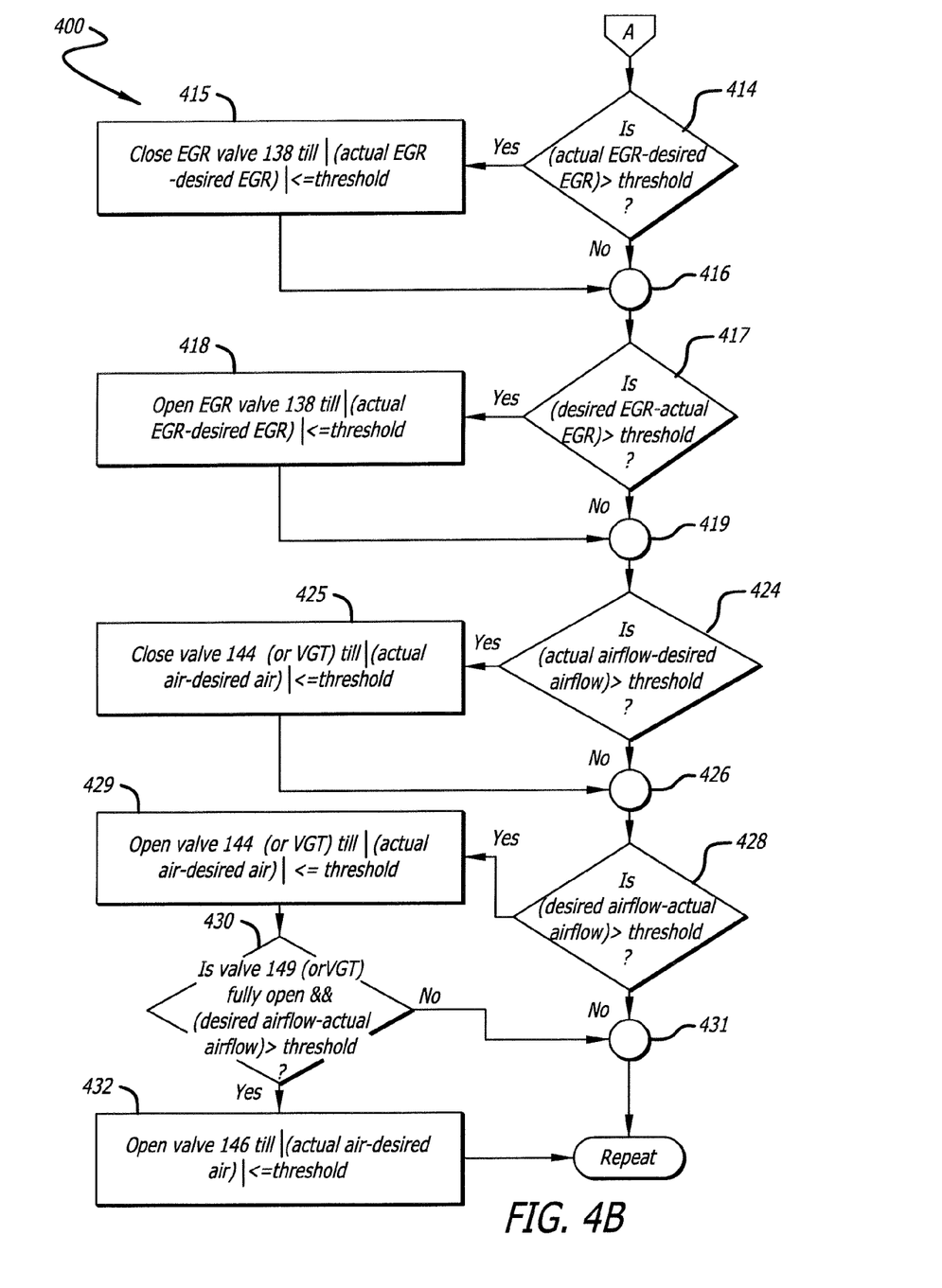
Figure 5:
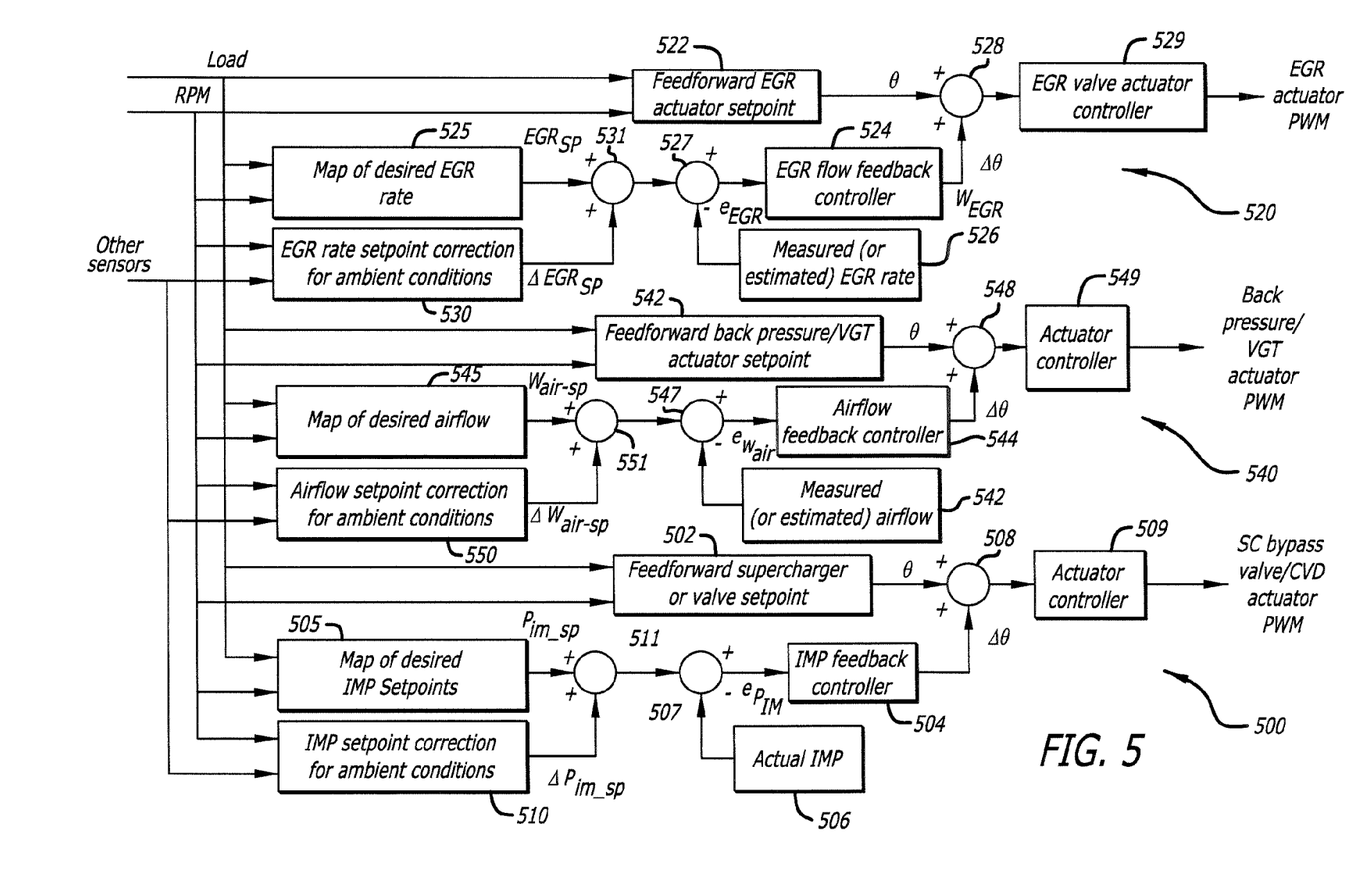
FIG. 5 is a schematic diagram showing a control mechanization that implements the evaluating and adjusting process of FIG. 4.

Air handling control to achieve desired trapped conditions such as trapped lambda and trapped burned gas fraction, and possibly, other trapped conditions, can be implemented using an air handling control mechanization based on that illustrated in FIG. 2, in which the ECU 149 can be programmed to control operations and conditions of the air handling system by methods illustrated by the diagrams of FIGS. 3-5. In this regard, FIG. 3 shows a loop for determining numerical values of air handling control parameters based on trapped conditions in a cylinder of the engine at LPC. In FIG. 4 a process for evaluating and adjusting the numerical values of the air handling control parameters is illustrated. FIG. 5 schematically illustrates a preferred control mechanization that implements the evaluating and adjusting process of FIG. 4.

With reference to FIGS. 2 and 3, a loop 300 reads available engine sensors 200 at 302 so as to be able to perform calculations, make estimates, and determine current setpoints for air flow, EGR flow, and intake manifold pressure (IMP). For example, with reference to FIG. 2, the ECU may read the following sensors:

Fresh air mass flow
Charge air cooler (CAC) output temperature
CAC output pressure
Intake $O_2$
Intake Manifold Temperature
Intake Manifold Pressure
Fuel Rail Pressure
Exhaust Manifold Pressure
Exhaust Gas Temperature
Turbo Outlet Pressure
Turbo Outlet Temperature
Engine Speed in RPM A torque parameter representing engine load demand is determined by an estimator 202 using, for example, numerical techniques based on flywheel motion, or extrapolation from sensed engine conditions such as accelerator pedal position and fuel demand. Using these, and possibly, other, sensed and estimated values, the ECU 149 at 304 determines the current engine operating state in terms of engine load and RPM. Based on the current engine operating state and a current value for fuel demand (306), the ECU 149, at step 308, determines the setpoints for the intake manifold pressure, EGR flow through the EGR loop, and rate of fresh air flow into the charge air subsystem from look-up tables that are indexed by engine load demand (LOAD) and engine RPM. These LUTs are pre-filled based on engine dynamometer testing and stored in or with the ECU 149. The ECU 149 then determines an actual intake manifold pressure, an actual rate of EGR flow through the EGR loop, and an actual rate of fresh air flow into the charge air subsystem based on physical sensors and/or model-based estimations such as are disclosed in priority application Ser. No. 13/926,360.

FIGS. 4A and 4B together illustrate a routine executed by the ECU 149 by which control of a plurality of external air handling conditions achieves desired in-cylinder trapped conditions. In this regard, "external air handling conditions" means air handling conditions that occur and/or are accessible externally of any cylinder of the engine. Relatedly, external air handling conditions include, but are not limited to, IMP, EGR flow, and fresh air flow.

With reference to FIG. 2, adjustment of IMP is carried out by one of controlling speed of the supercharger 110 and the position of the valve 139. If the supercharger 110 is driven by a variable drive mechanism 111, then the ECU 149 varies the drive ratio by provision of a Speed control signal. If the supercharger 110 is driven by fixed drive mechanism then the ECU 149 provides a Shunt control signal to change the position of the valve 139. With reference to FIGS. 2 and 4A, control of IMP is implemented by an air handling control routine 400 in which the routine accesses a map at 402 to determine desired IMP, EGR, and airflow setpoints to achieve desired trapped conditions for a current engine operating state. In steps 404-409, the routine evaluates the desired IMP setpoint by comparing it with an actual IMP numerical value that is obtained from sensor readings, estimation, and/or calculation. Preferably the comparing process includes subtracting the desired setpoint value from the actual value. If the actual IMP is greater than the desired setpoint, IMP is reduced at 405 by slowing the supercharger 110 or opening the valve 139 until the absolute value of the difference reaches the threshold. On the other hand, if the desired setpoint is greater than the actual IMP, IMP is increased at 408 by increasing the speed of supercharger 110 or closing the valve 139 until the absolute value of the difference reaches the threshold.

An exemplary control mechanization with which IMP can be controlled is shown in FIG. 5. This control mechanization includes an IMP controller 500 that adjusts actual IMP by controlling the speed of the supercharger 110 via the drive mechanism 111 or by controlling the position or setting of the valve 139. The IMP controller 500 includes a feed forward controller 502 and a feedback controller 504. The feed forward controller 502 outputs a supercharger actuator (or valve) set point Θ based on a map that is indexed by engine load and speed. This map is pre-filled with empirical data based on engine dynamometer testing and stored in or with the ECU 149. The feedback controller 504 receives the error ($e_{P_{IM}}$) between the desired IMP setpoint for the current engine operating state ($P_{im\_sp}$) and actual IMP 506, which is calculated by the adder 507, and converts this error into a change required in IMP (ΔΘ) to minimize the error. The feedback controller 504 can be implemented with a PID controller, a gain scheduled PID controller, or another non-linear controller such as a sliding mode controller. The output from the feedback controller 504 is added (or subtracted depending on the sign) to the output of the feed-forward controller 502 at 508. A final actuator command is then sent to the actuator controller 509 through the ECU 149. Depending on the construction of the supercharger drive 111, the supercharger output command is provided either as a speed control signal to the drive 111, or as a shunt control signal to the valve actuator 140.

Control of EGR is done in the same manner as IMP, except that the routine varies the EGR flow rate using the EGR valve 138 to minimize the error between the actual EGR flow and the desired EGR setpoint. Thus, as per FIG. 4B, in steps 414-419, the routine 400 evaluates the actual EGR flow numerical value by comparing it with the desired EGR flow setpoint. Preferably the comparing process includes subtracting the desired setpoint from the actual EGR value. If the absolute value of this difference is greater than a threshold, the routine 400 adjusts the EGR flow rate to place this difference within an acceptable limit. With reference to FIG. 2, this result can be achieved by controlling the setting of the EGR valve 138 via the actuator 141.

An exemplary control mechanization with which EGR flow can be controlled is shown in FIG. 5. This control mechanization includes an EGR controller 520 that adjusts actual EGR flow by controlling the position or setting of the valve 138. The EGR controller 520 includes a feed forward controller 522 and a feedback controller 524. The feed forward controller 522 outputs a valve set point Θ based on a map that is indexed by engine load and speed. This map is pre-filled with empirical data based on engine dynamometer testing and stored in or with the ECU 149. The feedback controller 524 receives the error ($e_{EGR}$) between the desired EGR setpoint for the current engine operating state ($EGR_{sp}$) and actual EGR flow rate 526, which is calculated by the adder 527, and converts this error into a change required in EGR flow rate (ΔΘ) to minimize the error. The feedback controller 524 can be implemented with a PID controller, a gain scheduled PID controller, or another non-linear controller such as a sliding mode controller. The output from the feedback controller 524 is added (or subtracted depending on the sign) to the output of the feed-forward controller 522 at 528. A final actuator command is then sent to the actuator controller 529 through the ECU 149. An EGR output command is provided as an EGR control signal to the valve actuator 141.

Referring again to FIG. 2, for airflow control, the strategy manipulates backpressure acting through the exhaust subsystem by means of two actuators—one (the actuator 145) for the back pressure valve 144 (or for turbine rack position if a VGT device is used) and one (the actuator 147) for the wastegate valve 146. If the turbine 121 is not a variable geometry device, then the ECU 149 varies the back pressure by provision of a Backpressure control signal. If the turbine 121 is a VGT device, then the ECU 149 provides the Backpressure control signal to change the geometry of the turbine 121. With reference to FIGS. 2 and 4B, control of fresh air flow is done in the same manner as IMP and EGR flow, except that the routine 400 varies the airflow rate using the backpressure valve 144 (or a VGT turbine) to minimize the error between the actual airflow and the desired airflow setpoint. Thus, as per FIG. 4B, in steps 424-429, the routine 400 evaluates the actual airflow numerical value by comparing it with the desired airflow setpoint. Preferably the comparing process includes subtracting the desired setpoint from the actual airflow value. If the absolute value of this difference is greater than a threshold, the routine 400 adjusts the airflow rate to place this difference within an acceptable limit. If the back pressure valve 144 is fully open and the actual airflow is still less than the desired airflow then the routine 400 transitions to the steps 428-432 so as to open up the wastegate valve 146 to meet the desired airflow setpoint.

An exemplary control mechanization with which fresh air flow can be controlled is shown in FIG. 5. This control mechanization includes a fresh air flow controller 540 that adjusts actual airflow by controlling the position or setting of the valve of the backpressure valve 144 (or the geometry of the turbine if a VGT device is used). The controller 540 includes a feed forward controller 542 and a feedback controller 544. The feed forward controller 542 outputs a backpressure valve (or VGT) setpoint Θ based on a map that is indexed by engine load and speed. This map is pre-filled with empirical data based on engine dynamometer testing and stored in or with the ECU 149. The feedback controller 544 receives the error ($e_{W_{air}}$) between the desired fresh air flow setpoint for the current engine operating state ($W_{air\_sp}$) and actual fresh air flow 546, which is calculated by the adder 547, and converts this error into a change required in fresh air flow (ΔΘ) to minimize the error. The feedback controller 544 can be implemented with a PID controller, a gain scheduled PID controller, or another non-linear controller such as a sliding mode controller. The output from the feedback controller 544 is added (or subtracted depending on the sign) to the output of the feed-forward controller 542 at 548. A final actuator command is then sent to the actuator controller 549 through the ECU 149. Depending on the construction of the turbine 121, the backpressure output command is provided as a Backpressure control signal to the backpressure valve actuator 145 (or to the turbine 121 if a VGT device is used). In some aspects, if the backpressure valve 144 (or a VGT device) is fully open and the actual fresh air flow is still less than the desired airflow then steps 428-432 of FIG. 4B cause the routine 400 to transition to a wastegate feedback controller (not shown in FIG. 5) that opens up the wastegate valve 146 in order to meet the desired fresh air flow setpoint. In this instance, the feedback controller for wastegate valve control is only active when the desired fresh air flow setpoint can't be met even with fully open backpressure valve 144.

With reference to FIG. 5, in some instances one or more of the desired setpoints determined at 505, 525, and 545 can be corrected to account for the effects of ambient conditions that may prevent the achievement of the desired trapped conditions by use of the desired setpoints. For example, the desired control setpoints may be compensated for intake manifold temperature and delivered fuel quantity variations from their respective base values. These variations are determined at 510, 530, and 550 and the respective desired setpoints are adjusted at 511, 531, and 551. An example of desired setpoint correction for trapped temperature is given in co-pending U.S. Ser. No. 13/974,883 , titled "Trapped Burned Gas Fraction Control For Opposed-Piston Engines With Uniflow Scavenging", which is filed concurrently herewith.

The loop 300 and the routine 400 described above are repeated continuously as the engine transitions from one operating state (engine load and speed) to another operating state (engine load and speed). While the engine operates at any particular operating state, the ECU 149 periodically calculates and sends out actuator commands for IMP control, EGR flow control, and fresh air flow control. Further, the calculations can happen in any order.

Although the air handling control embodiments and examples illustrated and described herein attribute actual parameter values based on conditions in the manifolds 125 and 130 to the cylinders of the engine, it should be evident to those skilled in the art that the principles involved can be applied to the individual cylinders themselves, presuming that cost and space permit placement and operation of relevant sensors on one or more of the cylinders of a production engine. Further, the desired parameter values are obtained by empirical methods that map or synchronize those values to port closing times for a cylinder of a uniflow scavenged, two-stroke cycle opposed-piston engine running, for example, in a dynamometer.

Although the air handling control embodiments and examples illustrated and described herein have been described with reference to an opposed-engine with two crankshafts, it should be understood that these constructions can be applied to opposed-piston engines with one or more crankshafts. Moreover, various aspects of these constructions can be applied to opposed-piston engines with ported cylinders disposed in opposition, and/or on either side of one or more crankshafts.

Although the air handling control embodiments and examples illustrated and described herein utilize the output of the supercharger 110 to control IMP and utilize the backpressure in the exhaust channel 124 to control fresh air flow, it should be understood that these roles can be exchanged. That is to say, the output of the supercharger 110 can be utilized to control fresh air flow and the backpressure in the exhaust channel 124 can be utilized to control IMP.

Accordingly, the patent protection accorded to the above-described constructions is limited only by the following claims.

The invention claimed is:

1. A uniflow-scavenged, opposed-piston engine, comprising:
at least one cylinder with a bore and axially-spaced exhaust and intake ports, and a pair of pistons disposed in opposition in the bore and operative to open and close the exhaust and intake ports during operation of the engine;
a charge air channel to provide charge air to an intake port;
an exhaust channel to receive exhaust gas from an exhaust port;
a supercharger operable to pump charge air in the charge air channel;
an exhaust gas recirculation (EGR) channel having an input coupled to the exhaust channel and an output coupled to the charge air channel; and,
a control mechanization operable to:
determine a plurality of air handling setpoints for trapped conditions in the at least one cylinder;
determine a plurality of external operating conditions of the air handling system; and,
adjust, based on the external operating conditions, the plurality of air handling setpoints.

2. The opposed-piston engine of claim 1, in which the control mechanization is operable to adjust a first setpoint for intake pressure in the charge air channel, a second setpoint for EGR flow in the EGR channel, and a third setpoint for fresh air flow into the charge air channel.

3. The opposed-piston engine of claim 1, in which the control mechanization is further operable to correct the air handling setpoints in response to changed engine operating conditions.

4. The opposed-piston engine of claim 1, in which the plurality of trapped conditions include trapped lambda, trapped burned gas fraction, and trapped temperature.

5. The opposed-piston engine of claim 4, in which the control mechanization is operable to adjust a first setpoint for intake pressure in the charge air channel, a second setpoint for EGR flow in the EGR channel, and a third setpoint for fresh air flow into the charge air channel.

6. The opposed-piston engine of claim 5, in which the control mechanization is operable to:
adjust intake pressure in the charge air channel by one of changing a speed of the supercharger and operating a first valve to shunt charge air flow from an output to an input of the supercharger;
adjust EGR flow in the EGR channel by operating a second valve to increase or decrease exhaust gas flow through the EGR channel; and,
adjust fresh air flow into the charge air channel by adjusting backpressure in the exhaust channel.

7. The opposed-piston engine of claim 6, in which the control mechanization is operable to adjust backpressure in the exhaust channel by one of operating a third valve in the exhaust channel or changing a turbine geometry in the exhaust channel.

8. The opposed-piston engine of claim 5, in which the control mechanization is further operable to correct the first, second, and third setpoints in response to changed engine operating conditions.

9. The opposed-piston engine of claim 8, in which the control mechanization is operable to:
adjust intake pressure in the charge air channel by one of changing a speed of the supercharger and operating a first valve to shunt charge air flow from an output to an input of the supercharger;

adjust EGR flow in the EGR channel by operating a second valve to increase or decrease exhaust gas flow through the EGR channel; and, adjust fresh air flow into the charge air channel by adjusting backpressure in the exhaust channel.

10. The opposed-piston engine of claim 9, in which the control mechanization is operable to adjust backpressure in the exhaust channel by one of operating a third valve in the exhaust channel or changing a turbine geometry in the exhaust channel.

11. An opposed-piston engine equipped with an air handling system, comprising:
at least one cylinder with a bore, axially-spaced exhaust and intake ports, and a pair of pistons disposed in opposition in the bore and operative to open and close the exhaust and intake ports during operation of the engine;
a charge air channel to provide charge air to an intake port;
an exhaust channel to receive exhaust gas from an exhaust port;
a supercharger operable to pump charge air in the charge air channel;
an exhaust gas recirculation (EGR) channel having an input coupled to the exhaust channel and an output coupled to the charge air channel; and,
a control mechanization operable to:
determine a plurality of air handling setpoints for trapped conditions in the at least one cylinder;
determine a plurality of external operating conditions of the air handling system;
change the setpoints in response to the external operating conditions; and
adjust, based on the changed setpoints, an intake manifold pressure in the charge air channel, an EGR flow in the EGR channel, and a backpressure in the exhaust channel.

12. The opposed-piston engine of claim 11, in which the control mechanization is operable to determine a first setpoint for the intake manifold pressure, a second setpoint for the EGR flow, and a third setpoint for the backpressure.

13. The opposed-piston engine of claim 12, in which the trapped conditions include trapped lambda, trapped burned gas fraction, and trapped temperature.

14. The opposed-piston engine of claim 12, in which the control mechanization is further operable to correct the setpoints in response to changed engine operating conditions.

15. A method of operating an opposed-piston engine with an air handling system, comprising:
generating exhaust gas in at least one ported cylinder of the engine;
transporting exhaust gas from an exhaust port of the at least one ported cylinder through an exhaust channel;
recirculating a portion of the exhaust gas from the exhaust channel through an EGR channel;
pressurizing fresh air;
mixing recirculated exhaust gas from the EGR channel with the pressurized fresh air to form charge air;
pressurizing the charge air with a supercharger;
providing the pressurized charge air to an intake port of the at least one ported cylinder;
determining a plurality of air handling setpoints for trapped conditions in the at least one ported cylinder;

determining a plurality of external operating conditions of the air handling system; and, adjusting, based on the external operating conditions, the plurality of air handling setpoints.

16. The method of claim 15, in which the plurality of trapped conditions include trapped lambda, trapped burned gas fraction, and trapped temperature.

17. The method of claim 16, in which adjusting the plurality of air handling setpoints include adjusting a first setpoint for intake pressure in the charge air channel, adjusting a second setpoint for EGR flow in the EGR channel, and adjusting a third setpoint for fresh air flow into the charge air channel.

18. The method of claim 17, in which:
in response to adjusting a first setpoint, adjusting intake pressure in the charge air channel by one of changing a speed of the supercharger and operating a first valve to shunt charge air flow from an output to an input of the supercharger;
in response to adjusting a second setpoint, adjusting EGR flow in the EGR channel by operating a second valve to increase or decrease exhaust gas flow through the EGR channel; and,
in response to adjusting a third setpoint, adjusting fresh air flow into the charge air channel by operating a backpressure in the exhaust channel.

19. A method of operating an opposed-piston engine equipped with one or more ported cylinders and a supercharger, comprising:
generating exhaust gas in at least one ported cylinder of the engine;
transporting exhaust gas from an exhaust port of the at least one ported cylinder through an exhaust channel;
recirculating a portion of the exhaust gas from the exhaust channel through an EGR channel;
pressurizing fresh air in a charge air channel;
mixing recirculated exhaust gas from the EGR channel with the pressurized fresh air to form charge air;
pressurizing the charge air with a supercharger;
providing the pressurized charge air to an intake port of the at least one ported cylinder;
determining a plurality of air handling setpoints for trapped conditions in the at least one cylinder;
determining a plurality of external air handling conditions;
changing the setpoints in response to the external air handling conditions; and
adjusting, based on the changed setpoints, an intake manifold pressure in the charge air channel, an EGR flow in the EGR channel, and a backpressure in the exhaust channel.

20. The method of claim 19, in which determining a plurality of air handling setpoints includes determining a first setpoint for the intake manifold pressure, determining a second setpoint for the EGR flow, and determining a third setpoint for the backpressure.

21. The method of claim 20, in which the trapped conditions include trapped lambda, trapped burned gas fraction, and trapped temperature.

22. The method of claim 19, in which determining the plurality of air handling setpoints includes correcting the setpoints in response to changed engine operating conditions.

* * * * *